United States Patent
Lloyd et al.

(10) Patent No.: US 10,216,967 B2
(45) Date of Patent: Feb. 26, 2019

(54) VOLATILE MEMORY-BASED DATA-TRANSFER DEVICE WITH AUTOMATIC AND USER-INITIATED ANTI-TAMPER PENALTIES

(71) Applicant: The United States of America as represented by the Secretary of the Navy, Washington, DC (US)

(72) Inventors: Jeffrey M. Lloyd, San Diego, CA (US); Michael Tall, San Diego, CA (US); Alex G. Phipps, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/659,519

(22) Filed: Jul. 25, 2017

(65) Prior Publication Data

US 2019/0034669 A1     Jan. 31, 2019

(51) Int. Cl.
    *G06F 12/02*      (2006.01)
    *G06F 13/24*      (2006.01)
    (Continued)

(52) U.S. Cl.
    CPC .......... *G06F 21/86* (2013.01); *G06F 12/0246* (2013.01); *G06F 12/0891* (2013.01);
    (Continued)

(58) Field of Classification Search
    CPC .. G06F 12/0246; G06F 12/0891; G06F 21/78; G06F 21/79; G06F 21/86; G06F 21/88; G06F 2221/2143
    See application file for complete search history.

(56) References Cited

U.S. PATENT DOCUMENTS

| 7,735,145 B2 | 6/2010 | Kuehnel et al. |
| 8,359,660 B2 | 1/2013 | Lang |

(Continued)

FOREIGN PATENT DOCUMENTS

| CN | 102521167 A | * 6/2012 |
| CN | 104598415 A | * 5/2015 |

OTHER PUBLICATIONS

English language machine translation of CN102521167A (Year: 2012).*

(Continued)

*Primary Examiner* — Glenn A. Auve
(74) *Attorney, Agent, or Firm* — SPAWAR Systems Center Pacific; Kyle Eppele

(57) ABSTRACT

A USB-style data-transfer device employs volatile memory that is connected to an onboard power-storage device for data storage. Through this design, any data stored on the memory can be physically cleared by interrupting the supply of electrical power from the onboard power-storage device to the memory. Enhanced security relative to conventional USB flash devices is provided by the volatile memory-based USB-style data-transfer device as the memory can be physically cleared without being plugged into a computer system either automatically when the onboard power storage device runs out of electrical power to supply to the volatile memory, or by user initiation through either a programmed instruction to interrupt the supply of electric power after a set time period or the operation of a manual switch which interrupts the supply of electric power.

19 Claims, 1 Drawing Sheet

(51) Int. Cl.
    *G06F 13/40* (2006.01)
    *G06F 13/42* (2006.01)
    *G06F 21/78* (2013.01)
    *G06F 21/79* (2013.01)
    *G06F 21/86* (2013.01)
    *G06F 21/88* (2013.01)
    *G06F 12/0891* (2016.01)

(52) U.S. Cl.
    CPC .......... *G06F 13/24* (2013.01); *G06F 13/4022* (2013.01); *G06F 13/4081* (2013.01); *G06F 13/4282* (2013.01); *G06F 21/78* (2013.01); *G06F 21/79* (2013.01); *G06F 21/88* (2013.01); *G06F 2212/7205* (2013.01); *G06F 2221/2143* (2013.01)

(56) References Cited

U.S. PATENT DOCUMENTS

| | | |
|---|---|---|
| 9,043,534 B2 | 5/2015 | Schroeter et al. |
| 9,081,946 B2 | 7/2015 | Fruhauf et al. |
| 9,111,621 B2 | 8/2015 | Krutzik et al. |
| 9,479,335 B2 | 10/2016 | Zachey |
| 2004/0225832 A1* | 11/2004 | Huang ............ G06K 19/07732 711/105 |
| 2005/0114570 A1* | 5/2005 | Chang ................ G06K 19/077 710/62 |
| 2006/0101190 A1* | 5/2006 | McLean .............. G06F 12/1433 711/100 |
| 2007/0112981 A1 | 5/2007 | Hernandez |
| 2009/0259793 A1* | 10/2009 | Muraki ............... G06F 21/6245 711/100 |
| 2010/0153708 A1* | 6/2010 | Malka ..................... G06F 21/78 713/155 |
| 2011/0231607 A1* | 9/2011 | Gao ..................... G06F 21/6218 711/115 |
| 2012/0093318 A1* | 4/2012 | Obukhov ............. G06F 21/6209 380/277 |
| 2012/0185636 A1 | 7/2012 | Leon et al. |

OTHER PUBLICATIONS

English language machine translation of CN104598415A (Year: 2015).*

* cited by examiner

VOLATILE MEMORY-BASED DATA-TRANSFER DEVICE WITH AUTOMATIC AND USER-INITIATED ANTI-TAMPER PENALTIES

STATEMENT OF GOVERNMENT INTEREST FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619) 553-5118; email: ssc_pac_t2@navy.mil.

BACKGROUND OF THE INVENTION

Field of the Invention

This invention relates generally to removable storage devices and more particularly, to removable storage devices with volatile memory.

Description of the Prior Art

There are various well-known removable data-storage devices which are used in the storage, data back-up and transfer of computer files. Legacy devices such as floppy disks and optical disc drives have been used for decades, but have well-established limitations, such as larger physical size, lower storage capacity, and slower transfer speeds. In present times, Universal Serial Bus ("USB") drives ("or thumb drives") are generally considered to be desirable alternatives to such legacy devices as they are physically smaller, operationally faster, have thousands of times more storage capacity, and are more durable and reliable.

Conventional USB drives, particularly those employing flash memory, have been shown to have vulnerabilities which make them potentially more risky to use relative to legacy devices such as optical disc drives. For example, conventional USB drives could potentially include embedded Trojan firmware that could operate without a user's knowledge on host systems. In addition, conventional USB drives may increase the potential of spreading viruses from one system to another and/or increase the potential of spillage of sensitive or classified information.

As a result of such vulnerabilities, many organizations have banned the use of USB drives for the purposes of file transfer on their computer systems and required the use of older technologies such as compact discs ("CD") and digital versatile discs ("DVD") for file transfers. Such requirements have been made despite the well-known benefits of USB drives over such optical disc drives like CDs and DVDs because the security vulnerabilities in conventional USB drives render USB drives unusable for many security sensitive applications. Accordingly, a need remains for a USB drive style data transfer device which can provide the inherent size, capacity, speed and durability benefits of conventional USB flash drives while eliminating the vulnerabilities of such flash drives.

Applicants' invention described herein provides a volatile memory-based USB-style data-transfer device with automatic and user-initiated anti-tamper penalties. Applicants' data-transfer device is designed to use volatile memory storage techniques so that the memory can be physically cleared without the need to plug the device into a computer system. In this regard, the Applicants' data-transfer device employs active and passive triggers that, when triggered, will lead to a penalty of complete erasure of the data stored on the device.

SUMMARY OF THE INVENTION

The present disclosure describes a USB-style data-transfer device. The device employs volatile memory that is connected to an onboard power storage device for data storage. Through this design, any data stored on the memory can be physically cleared by interrupting the supply of electrical power from the onboard power storage device to the memory. Enhanced security relative to conventional USB flash devices is provided by the volatile memory based USB style data transfer device as the memory can be physically cleared without being plugged into a computer system either automatically when the onboard power storage device runs out of electrical power to supply to the volatile memory, or by user initiation through either a programmed instruction to interrupt the supply of electric power after a set time period or the operation of a manual switch which interrupts the supply of electric power.

DETAILED DESCRIPTION OF THE INVENTION

Figure 1:
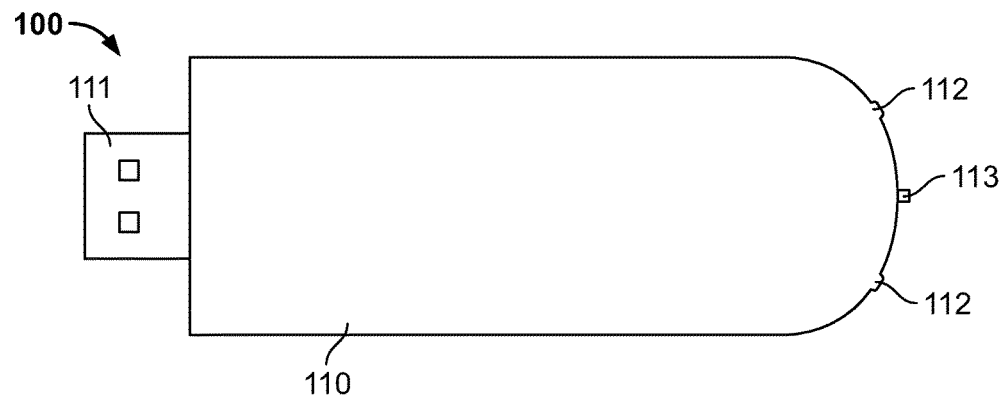
FIG. 1 shows a top plane view of a volatile memory-based USB data-transfer device built in accordance with the present invention.
Figure 2:
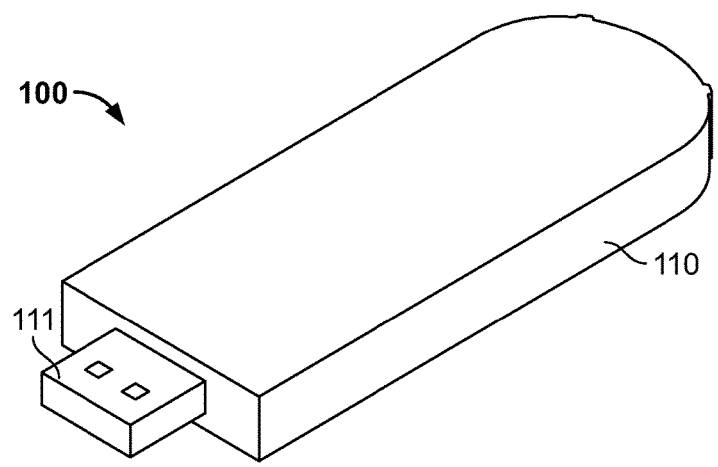
FIG. 2 shows a side perspective view of a volatile memory-based USB data-transfer device built in accordance with the present invention.
Figure 3:
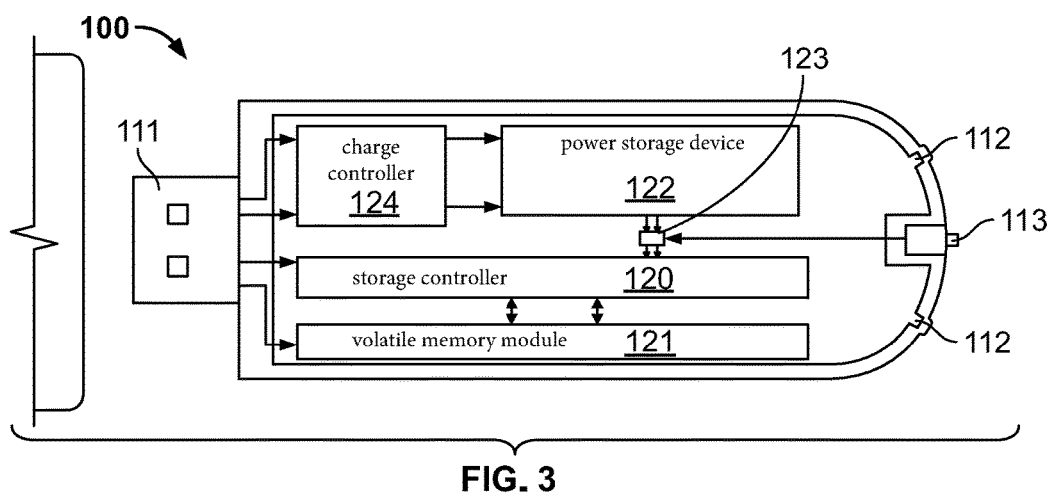
FIG. 3 shows a block diagram showing internal components of a volatile memory-based USB data-transfer device built in accordance with the present invention.

Referring now to FIGS. 1, 2, and 3, a volatile memory-based USB data-transfer device 100 which allows for the memory to be physically cleared without the need to plug the device into a computer system is shown. The volatile memory-based USB data-transfer device 100 defines an external housing 110 having a serial protocol plug 111 extending therefrom. In one embodiment, the external housing 110 defines a rigid cover in which the internal components of the volatile memory-based USB data-transfer device 100 (discussed in more detail below) are housed and the serial protocol plug 111 defines a Standard-A USB plug. It is contemplated, however, that in other embodiments the serial protocol plug 111 may alternatively define a Standard-C USB plug or another physical interface for a host computer.

In one embodiment, the external housing 110 includes a visual indicating system 112 and a switch actuator 113. The serial protocol plug 111 extends from the proximal side of the external housing 110 and the visual indicating system 112. Switch actuator 113 is positioned on the distal side of the external housing 110. In such an embodiment, a red light emitting diode (LED) and green LED may be employed as the visual indicating system 112, and the switch actuator 113 may operate as a spring-loaded push button. In other embodiments, alternate visual interfaces, such as a cholesteric liquid crystal display, may be employed as the visual indicating system 112. Further, in other embodiments, the switch actuator 113 may form an alternate type of mechanical linkage with an internal electrical switch, such as a lever, handle, or rocking mechanism.

Internally, the volatile memory-based USB data-transfer device 100 includes a printed circuit board to which the serial protocol plug 111 is connected and which additionally includes a USB mass storage controller 120, a volatile memory module 121, an onboard power-storage device 122, an electrical switch 123 and a charge controller 124. It is appreciated that the printed circuit board also includes an electronic oscillator which provides a clock signal to the USB mass storage controller 120.

The USB mass storage controller 120 is operatively connected to the volatile memory module 121, onboard power-storage device 122, and the electrical switch 123. Thus, in addition to implementing the USB mass storage device class specifications, the USB mass storage controller 120 includes firmware which controls the supply of electrical power from the onboard power-storage device 122 to the volatile memory module 121. In this regard, the USB mass storage controller 120 can interrupt the supply of electrical power to the volatile memory module 121 after a set duration of time (as measured from the clock signal). In addition, the supply of electrical power to the volatile memory module 121 can be interrupted in response to the operation of the electrical switch 123.

In one embodiment, the volatile memory module 121 is made up of a single or multiple static random-access memory chips. It is contemplated, however, that alternate volatile memory forms, including dynamic random-access memory, may be employed in the volatile memory module 121.

In one embodiment, the onboard power-storage device 122 defines a battery. In such an embodiment, a lithium ion battery of between 10 and 20 milliamp Hours ("mAh") may be employed as the onboard power-storage device 122. Advantageously, such a lithium ion battery of between 10 and 20 mAh could be charged quickly with external power supplied over the serial protocol plug 111 (such as when it is plugged into a host computer system).

In another embodiment, the onboard power-storage device 122 defines a supercapacitor. Advantageously, a supercapacitor can charge very quickly (1-2 minutes). Because the amount of energy that can be stored in a supercapacitor can be precisely known, it could be used to pre-set the amount of time before data on the volatile memory module 121 would be cleared due to a loss of electrical power from the voltage on the supercapacitor falling below a threshold value. As such, a user could give data on the volatile memory module 121 a very well-controlled lifetime.

In operation, the volatile memory-based USB data-transfer device 100 is structured to leverage the inherent properties of volatile memory in order to provide a storage technique which allows its internal memory to be completely and reliably cleared without the device being plugged into a computer system. In this regard, a user can ensure that no Trojan or other malicious software is present in the volatile memory-based USB data-transfer device 100 before plugging the device into the user's computer system. Similarly, after the volatile memory-based USB data transfer device 100 is used to transfer desired data, it can be completely and reliably cleared of all traces of the data so as to eliminate the possibility of "spillage" of sensitive or classified information.

In this regard, when the volatile memory-based USB data transfer device 100 plugged into a computer system for the purpose of receiving and storing data from that computer system (and possibly transferring the data to another computer system), all data being transferred onto the volatile memory-based USB data-transfer device 100 is stored in the volatile memory module 121. While the volatile memory-based USB data-transfer device 100 is plugged into the computer system, it is appreciated that the volatile memory module 121 may receive electrical power from the computer system in the same manner as conventional removable USB storage devices do. At the same time, the charging of the onboard power-storage device 122 will be managed by the charge controller 124. When the volatile memory-based USB data-transfer device 100 is unplugged from the computer system, stored electrical power from the onboard power-storage device 122 is directed to the volatile memory module 121 to allow data transferred to the volatile memory module 121 to remain in storage until power is lost or turned off.

It is appreciated that power may be lost when the onboard power storage device 122 runs out of stored electricity or when its voltage falls below a threshold value. On the other hand, power may be turned off (i.e., disconnected) to the volatile memory module 121 by operation of the USB mass storage controller 120 due to the expiration of a set time limit from when data was loaded (or the volatile memory-based USB data-transfer device 100 was removed from a computer system), as calculated through the electronic oscillator, or by operation of the electrical switch 123.

In one embodiment, the electrical switch 123 defines a momentary switch that is "on" so as to permit the flow of electrical power from onboard power-storage device 122 to the USB mass storage controller 120 and volatile memory module 121 unless the switch actuator 113 is engaged manually (by being depressed in the embodiment wherein the switch actuator 113 is a spring-loaded push-button actuator).

In one embodiment, the power requirements for the internal components of the volatile memory-based USB data-transfer device 100 during standby may be 120 microamperes (based on conventional commercial off the shelf integrated circuits) per gigabyte, thereby requiring 3 milliamp Hours of battery per day. During transfer, assuming a 1 megahertz transfer rate and 1 gigabyte in data stored, 7.5 milliamps may be required for 1000 seconds. Thus, if the onboard power-storage device 122 defines a battery, a 10-20 milliamp Hours lithium ion battery that measures 12.5 millimeters by 10 millimeters by 3 millimeters may be employed. It is contemplated, however, that alternate battery capacities, types and sizes may be employed for the same or other technical specifications.

While it is appreciated that the volatile memory based USB data transfer device 100 may be employed in substantially any capacity, it may be desirable to employ a capacity in the 1-2 gigabyte range.

In the embodiment in which the visual indicating system 112 defines a red LED and a green LED, the USB mass storage controller 120 causes the red LED to illuminate once data is transferred onto the volatile memory module 121 and remain illuminated until the erasure of the volatile memory module 121 is triggered. Once the erasure of the volatile memory module 121 is completed, the USB mass storage controller 120 causes the green LED to illuminate and remain illuminated until data is transferred back onto the volatile memory module 121.

In one embodiment, the USB mass storage controller 120 automatically triggers the erasure of the volatile memory module 121 by removing the supply of electrical power to the volatile memory module 121 once a defined period of time from when data is transferred onto the volatile memory module 121 elapses. It is contemplated that such a defined period of time may be defined by a user through a host computer system (a computer system into which the volatile memory-based USB data-transfer device 100 is plugged) or set at manufacture and could be short periods such as 30 minutes or longer periods such as 48 hours.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A removable, volatile memory-based USB data-transfer device, comprising:
   a housing having an integral serial protocol plug, wherein said serial protocol plug is adapted to removably attach to an external computer and, when attached to the external computer, draw electrical power from the external computer, receive data from the external computer, and transfer data to the external computer;
   a volatile memory module integral with said housing and adapted to store data received through the serial protocol plug from the external computer when supplied with electrical power;
   an onboard power-storage device integral with said housing and configured to receive and store a finite supply of electrical power drawn through the serial protocol plug from the external computer and, when the serial protocol plug is not attached to the external computer, selectively supply stored electrical power to the volatile memory module; and
   an electrical switch integral with said housing and configured to interrupt the supply of electrical power from the onboard power-storage device to the volatile memory module in response to manual actuation.

2. The removable, volatile memory-based USB data-transfer device of claim 1, wherein the serial protocol plug defines a universal serial bus plug.

3. The removable, volatile memory-based USB data-transfer device of claim 1, wherein said volatile memory module is adapted to store all data received through the serial protocol plug from the external computer.

4. The removable, volatile memory-based USB data transfer device of claim 1, additionally comprising a visual indicating system integral with said housing and adapted to provide an optical indication of a presence of data on the volatile memory module.

5. The removable, volatile memory-based USB data-transfer device of claim 4, wherein said visual indicating system includes a first light-emitting diode adapted to illuminate when data is transferred onto the volatile memory module and a second light-emitting diode adapted to illuminate when data is erased from the volatile memory module as a result of the supply of electrical power from the onboard power storage device to the volatile memory module being interrupted.

6. The removable, volatile memory-based USB data-transfer device of claim 1, wherein said electrical switch defines a momentary switch.

7. The removable, volatile memory-based USB data-transfer device of claim 6, additionally comprising a spring-loaded push-button actuator integral with said housing and accessible on an exterior of said housing, wherein said spring loaded push-button actuator is operatively connected to said momentary switch.

8. The removable, volatile memory-based USB data-transfer device of claim 1, additionally comprising a manual actuator integral with said housing and accessible on an exterior of said housing, wherein said manual actuator is operatively connected to said electrical switch.

9. A removable, volatile memory-based USB data-transfer device, comprising:
   a housing having an integral serial protocol plug, wherein said serial protocol plug is adapted to removably attach to an external computer and, when attached to the external computer, draw electrical power from the external computer, receive data from the external computer, and transfer data to the external computer;
   a volatile memory module integral with said housing and adapted to store data received through the serial protocol plug from the external computer when supplied with electrical power;
   an onboard power storage device integral with said housing and configured to receive and store a finite supply of electrical power drawn through the serial protocol plug from the external computer and, when the serial protocol plug is not attached to the external computer, selectively supply stored electrical power to the volatile memory module;
   a storage controller integral with said housing and adapted to direct the supply of electrical power from the onboard power-storage device to the volatile memory module when the serial protocol plug is not attached to the external computer, wherein said storage controller is additionally adapted to interrupt the supply of electrical power from the onboard power-storage device to the volatile memory module after a predetermined time period from at least one of data received through the serial protocol plug being stored on the volatile memory module and the serial protocol plug being disconnected from the external computer; and
   a visual indicating system integral with said housing and adapted to provide an optical indication of a presence of data on the volatile memory module.

10. The removable, volatile memory based USB data transfer device of claim 9, wherein the serial protocol plug defines a universal serial bus plug.

11. The removable, volatile memory-based USB data transfer device of claim 9, wherein said volatile memory module is adapted to store all data received through the serial protocol plug from the external computer.

12. The removable, volatile memory-based USB data-transfer device of claim 9, wherein said visual indicating system includes a first light-emitting diode adapted to illuminate when data is transferred onto the volatile memory module and a second light-emitting diode adapted to illuminate when data is erased from the volatile memory module as a result of the supply of electrical power from the onboard power storage device to the volatile memory module being interrupted.

13. A removable, volatile memory-based USB data transfer device, comprising:
   a housing having an integral serial protocol plug, wherein said serial protocol plug is adapted to removably attach to an external computer and, when attached to the external computer, draw electrical power from the external computer, receive data from the external computer, and transfer data to the external computer;
   a volatile memory module integral with said housing and adapted to store data received through the serial protocol plug from the external computer when supplied with electrical power;

an onboard power storage device integral with said housing and configured to receive and store a finite supply of electrical power drawn through the serial protocol plug from the external computer and, when the serial protocol plug is not attached to the external computer, selectively supply stored electrical power to the volatile memory module;

an electrical switch integral with said housing and configured to interrupt the supply of electrical power from the onboard power storage device to the volatile memory module in response to manual actuation; and a storage controller integral with said housing and adapted to direct the supply of electrical power from the onboard power storage device to the volatile memory module when the serial protocol plug is not attached to the external computer, wherein said storage controller is additionally adapted to interrupt the supply of electrical power from the onboard power storage device to the volatile memory module after a predetermined time period from at least one of data received through the serial protocol plug being stored on the volatile memory module and the serial protocol plug being disconnected from the external computer.

14. The removable, volatile memory-based USB data-transfer device of claim 13, wherein the serial protocol plug defines a universal serial bus plug.

15. The removable, volatile memory-based USB data-transfer device of claim 13, wherein said volatile memory module is adapted to store all data received through the serial protocol plug from the external computer.

16. The removable, volatile memory-based USB data-transfer device of claim 13, additionally comprising a visual indicating system integral with said housing and adapted to provide an optical indication of the presence of data on the volatile memory module.

17. The removable, volatile memory-based USB data transfer device of claim 16, wherein said visual indicating system includes a first light-emitting diode adapted to illuminate when data is transferred onto the volatile memory module and a second light-emitting diode adapted to illuminate when data is erased from the volatile memory module as a result of the supply of electrical power from the onboard power storage device to the volatile memory module being interrupted.

18. The removable, volatile memory-based USB data transfer device of claim 13, wherein said electrical switch defines a momentary switch.

19. The removable, volatile memory-based USB data transfer device of claim 18, additionally comprising a spring loaded push button actuator integral with said housing and accessible on an exterior of said housing, wherein said spring-loaded push button actuator is operatively connected to said momentary switch.

* * * * *